United States Patent [19]
Palsson

[11] 3,985,284
[45] Oct. 12, 1976

[54] MATERIAL IN THE FORM OF A WEB OR OF SHEETS FOR THE MANUFACTURE OF PACKING CONTAINERS OR PARTS THEREOF

[75] Inventor: Jan F. Palsson, Lund, Sweden

[73] Assignee: AB Ziristor, Lund, Sweden

[22] Filed: July 30, 1974

[21] Appl. No.: 493,134

[30] Foreign Application Priority Data
Aug. 2, 1973  Sweden.............................. 7310635

[52] U.S. Cl. ............................ 229/3.5 R; 229/48 T
[51] Int. Cl.² ....................... B65D 5/42; B65D 1/00; B65D 3/00; B65D 5/00
[58] Field of Search................. 117/44, 68, 155 UA, 117/158; 229/3.1, 3.5 R, 48 T; 427/284, 285, 288, 209, 210, 411

[56] References Cited
UNITED STATES PATENTS

| | | | |
|---|---|---|---|
| 3,305,383 | 2/1967 | Gordy.............................. | 117/44 X |
| 3,341,349 | 9/1967 | Feeney et al. ....................... | 117/44 |
| 3,463,656 | 8/1969 | Feeney et al. ....................... | 117/44 |

*Primary Examiner*—Michael R. Lusignan
*Attorney, Agent, or Firm*—Pierce, Scheffler & Parker

[57] ABSTRACT

A multi-layered packing material in the form of a web for use in constructing blanks to be erected into finished packaging containers comprises a relatively stiff base layer made of paper, cardboard or foamed plastic coated preferably on both sides with a layer of thermoplastic material, e.g. polyethylene. The laminated packing material may also include aluminum foil to establish a gas-proof barrier. At least one of the edges of the laminated packing material is provided with a narrow edge zone of a heat-activatable bonding agent of the same thickness as the web such as a mixture of solid hydrocarbons which is mechanically stable but elastic at normal temperature and has a relatively low melting temperature range. The edge zone consisting of the heat-activatable bonding agent is utilized in establishing a butt type joint between it and an adjacent panel or other planar part of the container when erected.

4 Claims, 4 Drawing Figures

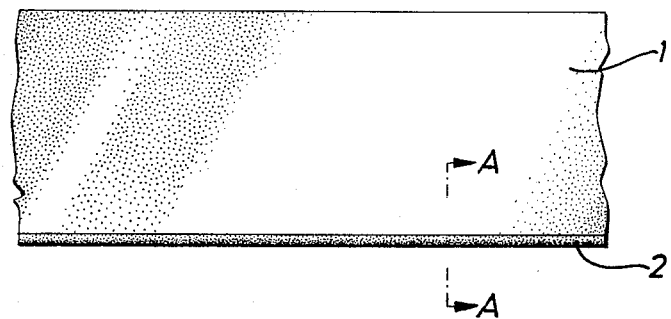
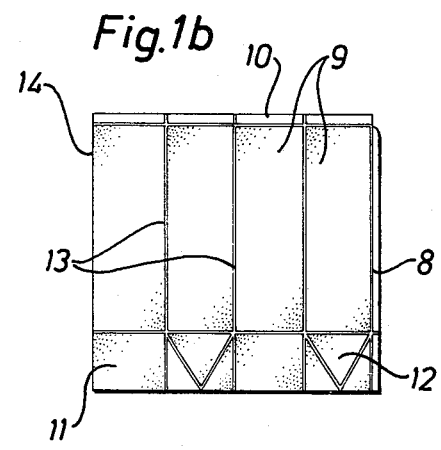
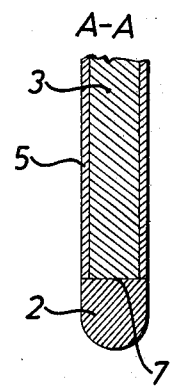
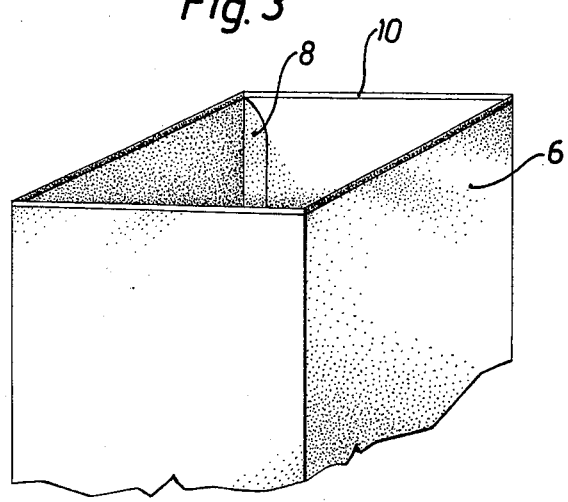

MATERIAL IN THE FORM OF A WEB OR OF SHEETS FOR THE MANUFACTURE OF PACKING CONTAINERS OR PARTS THEREOF

The present invention relates to material in the form of a web or of sheets for the manufacture of packing containers or parts thereof, the packing material comprising a relatively stiff carrier layer and an unbroken impermeable thermoplastic coating which is applied at least to that side of the material, which is intended to form the inside of the packing container.

It is well known in the technology of packaging that packing containers of a disposable character can be manufactured from packing material which consists on the one hand of a carrier layer which is mechanically sufficiently stiff and stable to provide the packing container with a well-defined, durable shape, and on the other hand of coating layers which cover at least the inside of the packing container. The said coating layers shall be impermeable to the intended contents and shall for the rest possess the barrier properties which are desired, e.g. impermeability to liquid, impermeability to gas, fat resistance etc. Packing material of the abovementioned type consists often of a mechanically stiff carrier layer of cardboard or paper, which on the one or preferably on both sides is provided with a thermoplastic coating of usually polyethylene. The polyethylene layer acts, besides being a barrier material impermeable to liquids, also as a sealing layer, since layers of polyethylene or some other thermoplastic material placed against one another can readily be melted together to form a tight and permanent joint by heating the plastic layers to melting whilst they are pressed at the same time against one another. Sealing of the abovementioned type can be carried out, however, advantageously only between surfaces of plastic material or carrier material coated with thermoplastic placed together, whilst butt joints can be carried out only with difficulties or not at all, partly because the packing material in general has a relative limited buckling strength which is generally insufficient for the sealing operation, since a relatively great sealing pressure is required for allowing the sealing to be carried out, partly because the packing material normally has a cut edge where the carrier material is exposed without plastic coating. A butt joint means here that a side edge of a material is combined with a side face of another material in such a manner that the surfaces of the materials form a generally right angle with one another.

Even though sealing joints of the butt type are difficult to realize where demands are made on the tightness of the joint and on the mechanical strength of the same, it is obvious that sealing joints of this type have great economic advantages, since great savings of packing material can be made. In conventional sealing joints of packages the sealing takes place along an area where the packing material surfaces overlap one another, which means that there is a doubling of packing material in certain areas, and with the conventional folded form of packages it happens quite often that three or four material layers are placed together and sealed to one another. In packing containers where the wall surfaces are combined with one another by butt joints, overlapping material surfaces can in principle be avoided.

The present invention relates to a packing material in the form of a web or sheets for the manufacture of packing containers the wall surfaces of which can be combined with one another by butt joints, and the packing material in accordance with the invention is characterized in that at least one of the side edges of the packing material has a narrow edge zone of a heat-activatable bonding medium, which zone extends in the plane of the packing material beyond the said edge to form a projecting portion. It is a further characteristic of the invention that said zone of heat-activatable bonding agent has substantially the same thickness as the rest of the packing material and that the heat-activatable bonding agent consists of a mixture of solid hydrocarbons, whose melting range is lower than the melting range of the plastic layer applied to the carrier layer.

The invention will be described in the following with the help of the enclosed schematic drawing, in which FIG. 1a shows a piece of a web of a packing material, FIG. 1b shows a sheet made into a blank for a packing container, FIG. 2 shows a strongly enlarged section through the edge zone of the web shown in FIG. 1a, and finally FIG. 3 shows the upper part of a prismatic packing container with square or rectangular cross-section.

The packing material web shown in FIG. 1 comprises a relatively stiff carrier layer of paper, cardboard or e.g. foamed plastic material, which carrier layer is coated preferably on both sides, but at least on the side which is intended to form the inside of the finished package with a thermoplastic coating layer of preferably polyethylene. Further coating layers may be present in the laminate such as e.g. aluminium foil or further plastic layers so as to provide the packing material with the desired barrier properties, e.g. impermeability to gas. The packing material web in accordance with FIG. 1a is provided with an edge zone coating 2, which forms an extension part of the web 1 with substantially the same thickness as the web 1. The layer of bonding agent 2 consists of a so-called "hot-melt" that is to say a mixture of waxes and plastics of low melting point and with good adhesion capacity in molten condition. Hot-melt can be said to be a collective term for heat-activatable bonding agents and it is possible by using different mixing ratios of the solid hydrocarbons to attain the properties of the bonding agent that are desired and the melting point of the bonding agents at which it is desired that the sealing should take place.

In FIG. 1b is shown a sheet formed to a blank for a packing container, which blank has a number of sidewall panels 9 and end wall panels 11,12 separated from one another as well as a connecting panel 8. The packing blank is intended to be formed to a packing container by folding along the bending lines 13 and sealing of the connecting panel 8 to the edge zone 14, whereby the packing blank forms a prismatic body with a substantially square cross-section. The panels 11,12 forming the end wall can be folded down in a known manner over one of the end openings of the prismatic body and joined to one another by heat-sealing of the thermoplastic surface coatings of the package blank to form a tight end wall. The edge of the package blank, which is opposite the panels 11,12 forming the end wall, is provided with a zone 10 of a heat-activatable bonding agent, so-called "hot-melt" which extends over the edge of the packing material. In FIG. 3 is shown the package blank in accordance with FIG. 1b after it has been folded to a prismatic body 6, the connecting panel 8 having been sealed against one of the sidewall panels.

As can be seen from FIG. 3 the upper end edge 10 of the prismatic container formed is provided with a part of the said heat-activatable coating projecting from the rest of the packing material, and the end opening of the container can readily be closed in that a disk which in shape and size corresponds or is a little larger than the end opening of the package body 6 is placed over the end opening and is lightly pressed against the same, whilst so much heat is supplied that the heat-activatable bonding agent 10 is activated. When the bonding agent has been made to cool down again, the end plate applied is joined to the package body 6 by a tight and durable connection in a butt joint which does not comprise any doubling of the packing material. To obtain a better sealing result the inside of the said disk may be provided with a "hot-melt" coating.

It is also possible of course to provide both edges of the package blank with a "hot-melt" coating and not, as is the case in the blank shown in FIG. 1, only provide one edge with a "hot-melt" coating 10, whilst the other edge is provided with end wall forming lugs 11,12. It is likewise possible to provide the web shown in FIG. 1a with a "hot-melt" coating 2 along both web edges, and to manufacture a packing container in accordance with FIG. 3 by applying endwalls to both end openings of the prismatic container body 6 with the help of "hot-melt."

In FIG. 2 is shown a strongly enlarged cross-section of a section A—A through the web in accordance with FIG. 1a. The cross-section shown in FIG. 2 comprises a carrier layer 3 of paper cardboard or e.g. foamed plastic and then preferably foamed polystyrene. The carrier layer 3 is coated on both sides with homogeneous polyethylene or polypropylene or, if the carrier layer 3 consists of foamed polystyrene, also with homogeneous polystyrene material. To the cut edge 7 of the carrier layer 3 is fixed a strand 2 of a heat-activatable bonding agent, so-called "hot-melt," which strand has approximately the same thickness as the packing material and constitutes an extension of the same. At normal room temperature the "hot-melt" strand 2 constitutes a flexible and elastic part of the packing material which part is relatively solid and hard, and it can be compared in its consistency with a softer plastic. When heat is supplied to the end region of the packing material web where the strand of bonding agent 2 is situated the latter is caused to melt at a temperature which is lower than the melting temperature or the softening temperature of the coating layers 4,5, and in heated condition the strand of bonding agent 2 becomes plastic and readily adheres to other material, e.g. a plastic-coated cardboard disk which is pressed against the strand of bonding agent 2. After cooling, the bonding agent 2 is stabilized again and a durable and mechanically resistant connection between the pressed-on object and the strand of bonding agent 2 has been achieved. To achieve a better and safer sealed joint it is appropriate to provide also the plastic-coated cardboard disk or foamed plastic with a "hot-melt" coating, at least along the sealing distance.

In FIG. 3 is shown the prismatic container body 6, which is formed by folding together of a blank in accordance with FIG. 1b and as can be seen from the figure, the upper "hot-melt" rim 10 is arranged in one and the same plane. As mentioned earlier, the upper end opening of the prismatic container body 6 can be closed by means of a cardboard or foamed plastic disk, which disk must have a heat-sealable inner layer, e.g. a "hot-melt" layer. Before applying the disk over the opening of the container body 6 the bonding agent 10 is activated by heating, whereupon the disk is pressed firmly over the opening. It would also be possible first to apply the disk over the opening and only subsequently supply heat by means of a heated open die through the disk so that the bonding agent 10 is heated. The latter method would be slower however in its application since the whole end sealing disk has to be heated and the cooling time is consequently longer.

A strand of bonding agent 2 can be applied to the packing material web in accordance with FIG. 1a and to the package blank in accordance with FIG. 1b by dipping the edge zone of the packing material web, or the edge of the package blank into a melt containing the heat-activatable bonding agent. Immediately after the application it is appropriate to pass the packing material web between compression rollers which are preferably chilled and with the help of which the bonding agent applied is rolled out to the same thickness as the packing material web 1. It is also possible to apply the bonding agent by means of a spray arrangement which through a fine nozzle sprays out a jet of molten bonding agent which is made to strike against the edge zone of the web 1 whilst it is moved past the spraying device so that a layer of bonding agent 2 will adhere to the edge zone. After the application of the bonding agent the packing material web here too can be passed between chilled compression rollers, the bonding agent applied being rolled out to a thickness which corresponds to the thickness of the packing material web.

It has been found that a packing material in accordance with the invention is cheap to manufacture and that it solves many sealing problems which previously had been difficult or impossible to solve by simple thermoplastic coating of the carrier layer of the packing material web.

I claim:

1. A packaging material for manufacturing packing containers, said material having a planar form and said containers being closable by abuttingly sealing a lid member to the upper edges of the walls of said containers, said material comprising a base layer of a relatively stiff packaging material, an impermeable thermoplastic coating on at least that surface of said base layer which forms the inside of the container, at least that edge of said planar packaging material which forms the upper edge of the walls of the container being provided with a relatively narrow portion of a heat-activatable bonding agent projecting beyond the edges of the base layer, said projecting portion extending coplanarly with said base layer and having substantially the same thickness as said base layer.

2. A packaging material as claimed in claim 1 wherein said heat activatable bonding agent comprises a mixture of solid hydrocarbons which mixture is mechanically stable and elastic at normal temperatures and has a softening point below that of the impermeable thermoplastic coating on said base layer.

3. A packaging material as claimed in claim 2 wherein said mixture of hydrocarbons comprises a petroleum wax and a polyolefin.

4. A packaging material as claimed in claim 1 wherein said base layer is composed of foamed polystyrene.

* * * * *